(12) United States Patent
Kondo et al.

(10) Patent No.: US 10,837,890 B2
(45) Date of Patent: Nov. 17, 2020

(54) PARTICLE MEASURING DEVICE AND PARTICLE MEASURING METHOD

(71) Applicants: RION Co., Ltd., Tokyo (JP); NATIONAL INSTITUTE OF ADVANCED INDUSTRIAL SCIENCE AND TECHNOLOGY, Tokyo (JP)

(72) Inventors: Kaoru Kondo, Tokyo (JP); Takuya Tabuchi, Tokyo (JP); Kazuna Bando, Tokyo (JP); Haruhisa Kato, Ibaraki (JP); Yusuke Matsuura, Ibaraki (JP)

(73) Assignees: RION Co., Ltd., Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/604,597

(22) PCT Filed: Mar. 30, 2018

(86) PCT No.: PCT/JP2018/013933
§ 371 (c)(1),
(2) Date: Oct. 11, 2019

(87) PCT Pub. No.: WO2018/190162
PCT Pub. Date: Oct. 18, 2018

(65) Prior Publication Data
US 2020/0124514 A1  Apr. 23, 2020

(30) Foreign Application Priority Data

Apr. 14, 2017  (JP) .................................. 2017-080345
Mar. 9, 2018  (JP) .................................. 2018-043634

(51) Int. Cl.
*G01N 15/02* (2006.01)
*G01N 21/05* (2006.01)
*G01P 3/36* (2006.01)

(52) U.S. Cl.
CPC ......... *G01N 15/0205* (2013.01); *G01N 21/05* (2013.01); *G01P 3/36* (2013.01)

(58) Field of Classification Search
CPC .............. G01N 15/0205; G01N 21/05; G01N 21/0303; G01N 21/62; G01N 35/08;
(Continued)

(56) References Cited

U.S. PATENT DOCUMENTS 4,830,494 A * 5/1989 Ishikawa ............ G01N 15/1459
                                           250/574
4,866,639 A * 9/1989 Adrian .................... G01P 5/001
                                           356/28

(Continued)

FOREIGN PATENT DOCUMENTS

JP  H6-026823 A   2/1994
JP  H11-211651 A2  8/1999
(Continued)

OTHER PUBLICATIONS

International Search Report dated Jul. 17, 2018 filed in PCT/JP2018/013933.
(Continued)

*Primary Examiner* — Mohamed K Amara
(74) *Attorney, Agent, or Firm* — Rankin, Hill & Clark LLP (57) ABSTRACT

Provided is a particle measuring device and a particle measuring method for measuring a particle size with favorable accuracy. A flow cell (1) includes a flow passage (1a) of sample fluid. An irradiation optical system (3) irradiates, with light from a light source (2), the sample fluid in the flow
(Continued)

passage (1a). An imaging unit (4) captures, from an extension direction of the flow passage (1a), an image of scattered light from the particle in a detection region in the flow passage (1a), the light passing through the detection region. A particle size specifying unit specifies a movement amount of the particle in a two-dimensional direction by Brownian motion based on multiple still images of a particle image captured at a predetermined frame rate by the imaging unit (4), thereby specifying the particle size of the particle from the movement amount in the two-dimensional direction.

11 Claims, 9 Drawing Sheets

(58) Field of Classification Search
CPC ............. G01N 37/00; G01N 2021/052; G01N 21/3504; G01N 21/0332; G01N 30/74; G01N 21/658; G01P 3/36; G01J 3/0291; G01J 3/42; B01L 3/502753; B01L 3/502; B01L 2300/0887; B01L 2300/0874; B01L 2200/0684; B01L 2300/0809; B01L 2300/0832; B01L 2300/0883; B01L 2300/14; B81B 1/00; B01J 19/00; B01D 15/16
See application file for complete search history.

(56) References Cited

U.S. PATENT DOCUMENTS

| | | | |
|---|---|---|---|
| 5,282,151 A | 1/1994 | Knollenberg | |
| 6,839,140 B1* | 1/2005 | O'Keefe | G01N 21/31 356/436 |
| 7,253,413 B2* | 8/2007 | Sauer | G01N 21/3504 250/339.08 |
| 7,833,802 B2* | 11/2010 | Henry | G01N 1/24 250/282 |
| 9,297,737 B2* | 3/2016 | Trainer | G01N 15/0205 |
| 10,234,370 B2* | 3/2019 | Kato | G01N 15/1468 |
| 2003/0143117 A1* | 7/2003 | Nagai | G01N 15/1459 422/73 |
| 2006/0262303 A1* | 11/2006 | Bonne | G01F 1/6845 356/328 |
| 2007/0229823 A1* | 10/2007 | Sung | G01N 21/658 356/336 |
| 2007/0242269 A1* | 10/2007 | Trainer | G01N 15/0205 356/336 |
| 2009/0161108 A1* | 6/2009 | Frese | B01L 3/5027 356/440 |
| 2009/0323061 A1* | 12/2009 | Novotny | G01N 15/1456 356/336 |
| 2010/0291588 A1* | 11/2010 | McDevitt | B01L 3/502715 435/7.2 |
| 2012/0219985 A1* | 8/2012 | Yoon | G01N 21/6458 435/32 |
| 2014/0099659 A1* | 4/2014 | Keller | G02B 21/06 435/29 |
| 2014/0187675 A1* | 7/2014 | Ootake | H01B 3/40 523/443 |
| 2015/0047440 A1* | 2/2015 | Gardhagen | B01L 3/502746 73/863 |
| 2015/0049333 A1 | 2/2015 | Gourley | |
| 2015/0346076 A1 | 12/2015 | Stramski et al. | |
| 2017/0074768 A1* | 3/2017 | Moitzi | G01N 15/1463 |
| 2017/0160178 A1 | 6/2017 | Matsuda et al. | |
| 2017/0254739 A1* | 9/2017 | Faez | G01N 15/1436 |
| 2017/0322133 A1* | 11/2017 | Trainer | G01N 15/0211 |
| 2018/0031464 A1* | 2/2018 | Norisuye | G01N 29/032 |
| 2018/0038781 A1 | 2/2018 | Matsuda et al. | |
| 2018/0120214 A1 | 5/2018 | Kato et al. | |
| 2018/0224408 A1* | 8/2018 | Sakai | G01N 37/00 |
| 2018/0238845 A1* | 8/2018 | Eliason | G01N 21/255 |
| 2019/0086322 A1* | 3/2019 | Beyette | G01N 21/0303 |
| 2020/0011781 A1* | 1/2020 | Kawano | G01N 15/02 |
| 2020/0025665 A1* | 1/2020 | Trainer | G01N 15/1459 |

FOREIGN PATENT DOCUMENTS

| | | |
|---|---|---|
| JP | 6030740 B1 | 11/2016 |
| WO | 2015/187881 A1 | 12/2015 |
| WO | 2016/143696 A1 | 9/2016 |
| WO | 2016/159131 A1 | 10/2016 |
| WO | 2017/069250 A1 | 4/2017 |

OTHER PUBLICATIONS

Decision to Grant dated Jun. 20, 2019 for the corresponding Japanese Patent Application No. 2018-043634.

Extended European Search Report (EESR) dated Apr. 17, 2020 issued in the corresponding European Patent Application No. 18783731.5.

Fan et al., "Simultaneous, two-camera, 2D gas-phase temperature and velocity measurements by thermographic particle image velocimetry with ZnO tracers", Experimens in Fluids, 2017, vol. 58, No. 34, 12 pages; Cited in EESR.

Skupsch et al., "Multiple-plane particle image velocimetry using a light-field camera", Optics Express, Jan. 28, 2013, vol. 21, No. 2, pp. 1726-1740; Cite in EESR.

* cited by examiner

(a) FIELD OF VIEW OF IMAGE CAPTURING UNIT 61

(b) FLOW RATE DISTRIBUTION (c) BROWNIAN MOTION DETECTED IN X-Y PLANE

PARTICLE MEASURING DEVICE AND PARTICLE MEASURING METHOD

TECHNICAL FIELD

The present disclosure relates to a particle measuring device and a particle measuring method.

BACKGROUND ART

A particle counter using a light scattering phenomenon has been broadly known. However, the light scattering phenomenon depends on the relative refractive index of a solvent and a solute (a particle). For this reason, when gold colloid particles (a refractive index: 0.467-i2.41 (in the case of a light source wavelength of 532 nm)) with a particle size of 30 nm in water (a refractive index: 1.33) is measured by using, e.g., a particle counter calibrated by polystyrene latex particles (PSL particles, a refractive index: 1.59) in the water, the particle size is evaluated as about 75 nm.

Meanwhile, a particle measuring method for obtaining a particle size from a measured movement amount has been proposed, focusing on a particle movement amount (displacement amount) by Brownian motion according to a Stokes-Einstein formula. In this measuring method, an image of sample fluid is, by using a linear flow cell, captured from the vertical direction against a sample fluid flow direction at a predetermined time interval by an imaging unit. Then, such a captured image is analyzed to obtain the particle size based on the particle movement amount by the Brownian motion (see, e.g., Patent Literature 1).

CITATION LIST

Patent Literature

PATENT LITERATURE 1: WO 2016/159131 A

SUMMARY

Problems to be Solved by the Invention

In the above-described particle measuring method, the image of the sample fluid is captured from the substantially vertical direction against the sample fluid flow direction. Thus, the captured image includes not only the movement amount by the Brownian motion, but also a movement amount by a sample fluid flow velocity. For this reason, for specifying the particle movement amount by the Brownian motion, the movement amount by the sample fluid flow velocity needs to be subtracted from a particle movement amount in the sample fluid flow direction. However, it is not easy to obtain accurate flow velocity distribution in the flow cell. For this reason, an error is easily caused in the particle movement amount by the Brownian motion and therefore in a particle size measurement value.

The particle measuring device and the particle measuring method of the present disclosure have been made in view of the above-described problems. That is, the present disclosure is intended to provide a particle measuring device and a particle measuring method for measuring a particle size and a number concentration for each particle size with favorable accuracy.

Solutions to the Problems

The particle measuring device according to the present disclosure includes a flow cell forming a flow passage of sample fluid containing particles, a light source configured to output light, an irradiation optical system configured to irradiate, with the light from the light source, the sample fluid in the flow passage, a first imaging unit configured to capture, from an extension direction of the flow passage, an image of scattered light from the particle in a detection region, through which the light passes, in the flow passage, and a particle size specifying unit. The particle size specifying unit specifies a movement amount of the particle in a two-dimensional direction by Brownian motion based on multiple still images of a particle image captured at a predetermined frame rate by the first imaging unit. Then, the particle size specifying unit specifies the particle size of the particle from the movement amount in the two-dimensional direction.

The particle measuring method according to the present disclosure includes irradiating, with light from a light source, sample fluid in a flow passage formed by a flow cell; capturing, from an extension direction of the flow passage, an image of scattered light from a particle in a detection region in the flow passage, the light passing through the detection region; specifying a movement amount of the particle in a two-dimensional direction by Brownian motion based on multiple still images of a particle image captured at a predetermined frame rate; and specifying the particle size of the particle from the movement amount in the two-dimensional direction.

Effects of the Invention

According to the present disclosure, the particle measuring device and the particle measuring method for measuring the particle size with favorable accuracy are provided.

DESCRIPTION OF THE EMBODIMENTS

Hereinafter, embodiments of the present disclosure will be described with reference to the drawings.

First Embodiment

Figure 1:
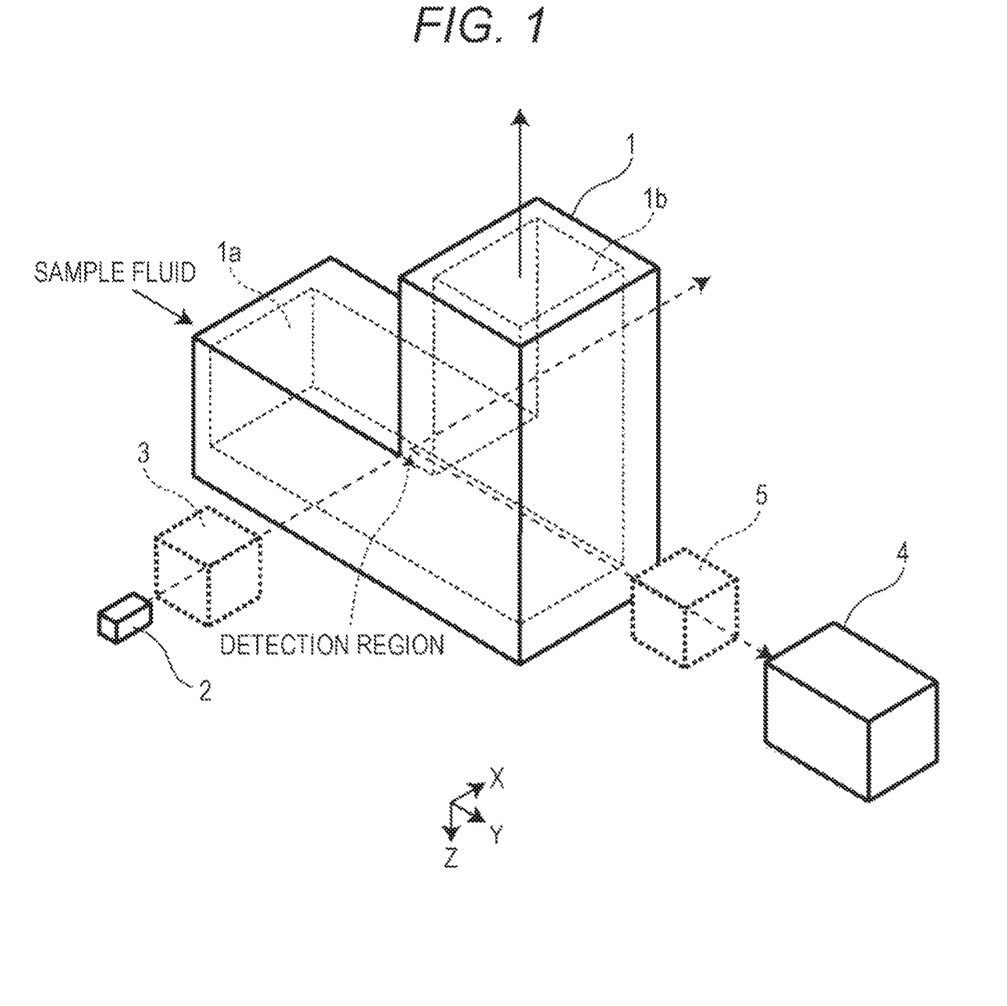
FIG. 1 illustrates a perspective view of an optical structure of a particle measuring device according to a first embodiment of the present disclosure.
Figure 2:
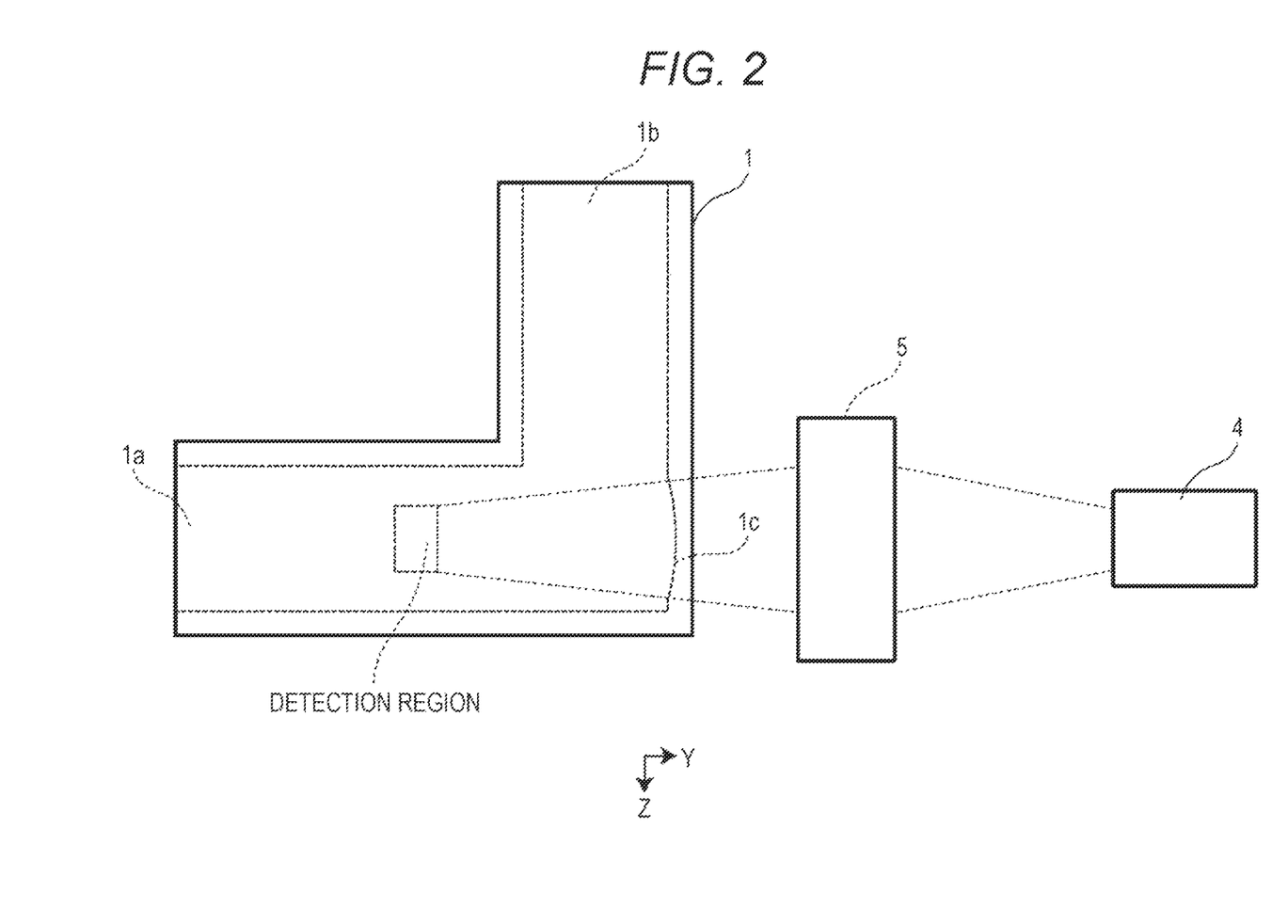
FIG. 2 illustrates a side view of the particle measuring device illustrated in FIG. 1.

FIG. 1 is a perspective view of an optical structure of a particle measuring device according to a first embodiment of the present disclosure. FIG. 2 is a side view of the particle measuring device illustrated in FIG. 1.

In FIG. 1, a flow cell 1 is bent in an L-shape. The flow cell 1 includes a linear first flow passage 1a (a Y-direction in FIG. 1) in which sample fluid flows, and a linear second flow passage 1b (a Z-direction in FIG. 1) in which the sample fluid flows. The sectional (a section parallel to an X-Z plane) shape of the first flow passage 1a is, for example, a rectangle of about 1 mm×1 mm. The section (a section parallel to an X-Y plane) of the second flow passage 1b is also in a rectangular shape. For example, the flow cell 1 is made of synthetic quartz or sapphire. Note that as long as the flow cell 1 has an L-shaped bent portion, the flow cell 1 may be in a shape such as a crank shape and a U-shape.

A light source 2 is, for example, a light source configured to emit irradiation light such as laser light. An irradiation optical system 3 irradiates, with the laser light emitted from the light source 2 and shaped in a predetermined shape, the sample fluid from the vertical direction (an X-direction in FIG. 1) against a sample fluid traveling direction (the Y-direction in FIG. 1) in the first flow passage 1a.

An imaging unit 4 (a first imaging unit) includes an image sensor such as a charge coupled device (CCD) and a complementary metal oxide semiconductor (CMOS) sensor. By using such an image sensor, a particle image is, from a position facing a fluid flow direction in an extension direction of the first flow passage 1a, captured by the imaging unit 4 based on scattered light from a particle in a detection region in the first flow passage 1a, the laser light passing through the detection region. In the first embodiment of the present disclosure, the flow cell 1 is bent in the L-shape such that the sample fluid flow direction is changed from the first flow passage 1a (the Y-direction) to the second flow passage 1b (the Z-direction). Note that the sample fluid flow direction is not limited to above. For example, a sample fluid flow may be changed from the second flow passage 1b (the Z-direction) to the first flow passage 1a (the Y-direction). In this case, the imaging unit 4 captures the image from a position opposite to the flow direction in the detection region of the first flow passage 1a.

A condensing optical system 5 condenses the scattered light from the particle in the detection region of the first flow passage 1a through which the laser light passes to the image sensor of the imaging unit 4. The condensing optical system 5 includes, for example, a spherical lens or an aspherical lens. The condensing optical system 5 has an optical axis in an extension direction (the Y-direction in FIG. 1) of the fluid flow in the detection region of the first flow passage 1a. Moreover, this optical axis passes through the center of the detection region and the center of the image sensor of the imaging unit. That is, the "detection region" is a region where the laser light and a light condensing area of the condensing optical system 5 on the image sensor cross each other. In the detection region described herein, the depth of field of the imaging unit 4 and the depth of field of the condensing optical system 5 are preferably larger than the width of the laser light in the above-described optical axis direction.

Note that as illustrated in FIG. 2, a spherical dimple 1c (a concave lens shape) is formed at an inner wall of the flow cell 1 positioned between the above-described detection region and the condensing optical system 5. As described above, a distance from the detection region to a spherical surface (the dimple 1c) can be substantially set to the curvature radius of the spherical surface. As a result, refraction of the scattered light entering the inner wall of the flow cell 1 from the detection region can be reduced. Further, the accuracy of measurement of a movement amount in the X-Z plane can be easily improved. Note that correction may be made by computing processing instead of providing the dimple 1c.

Figure 3:
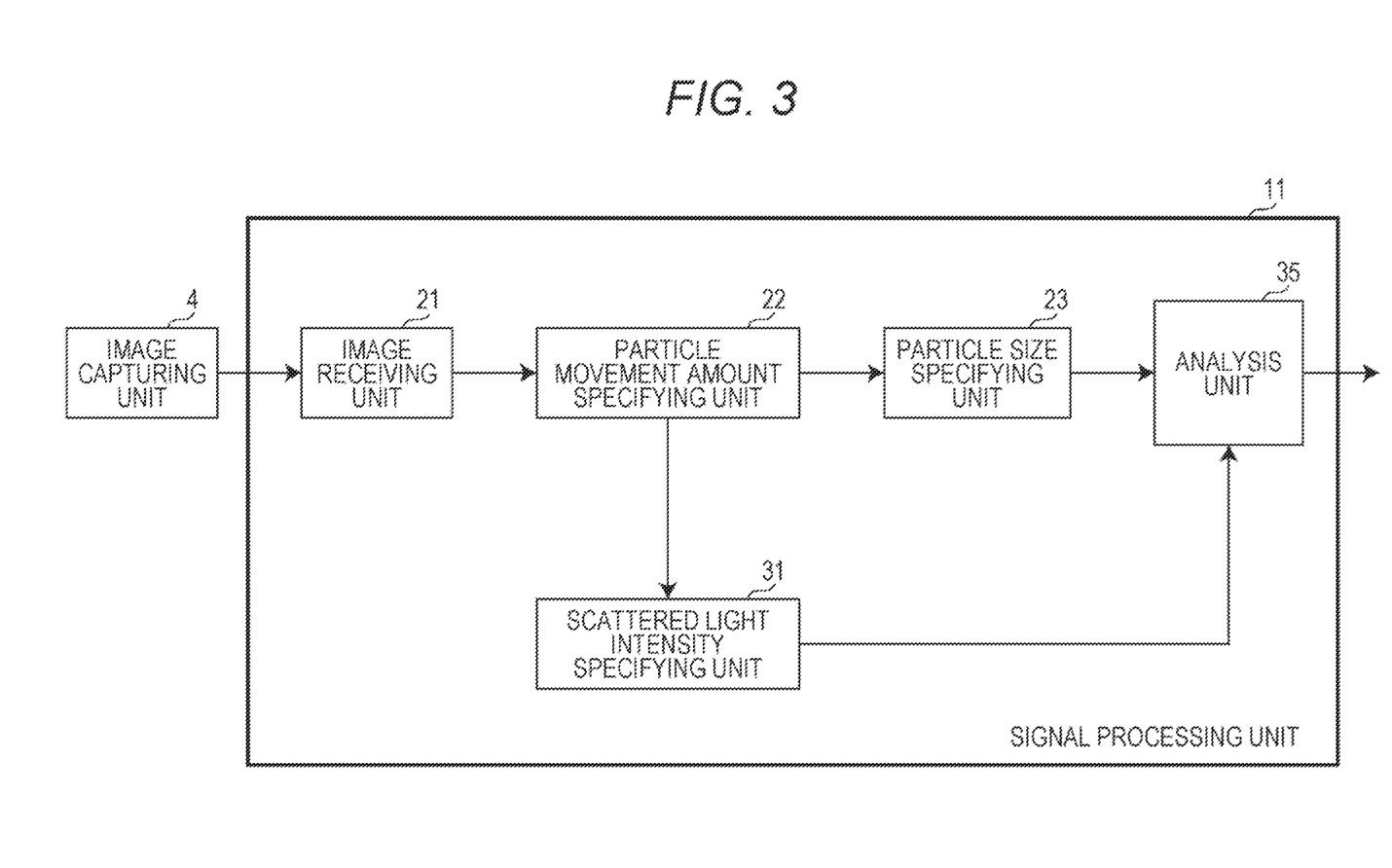
FIG. 3 illustrates a block diagram of an electric structure of the particle measuring device according to the first embodiment of the present disclosure.

FIG. 3 is a block diagram of an electric structure of the particle measuring device according to the first embodiment of the present disclosure. In FIG. 3, a signal processing unit 11 receives the captured image from the imaging unit 4. Based on such a captured image, the signal processing unit 11 calculates, as described above, a particle size, a number concentration for each particle size, a particle refractive index, and the like.

The signal processing unit 11 includes an image receiving unit 21, a particle movement amount specifying unit 22, and a particle size specifying unit 23.

The image receiving unit 21 receives, from the imaging unit 4, multiple frames (still images) captured by the imaging unit 4 at a predetermined frame rate (the number of captured still images forming a moving image per unit time, such as a unit of fps: frames per second) of, for example, 30 (fps).

The particle movement amount specifying unit 22 specifies the particle at each frame. Further, the particle movement amount specifying unit 22 associates the same particle at each frame, and specifies the movement amount. In addition, the particle movement amount specifying unit 22 sends image information to a scattered light intensity specifying unit 31 in the case of specifying the particle.

The particle movement amount specifying unit 22 takes, for example, the position of each particle at a previous frame (a still image) as a base point, thereby searching the particle within a predetermined area at a current frame from the base point. The particle found within the predetermined area is specified as the same particle as that at the previous frame. Thus, a particle track is specified across the multiple frames. As a result, each movement amount x, z in a two-dimensional direction by Brownian motion is specified.

The sample fluid flows in a laminar flow state along the Y-direction in and around the detection region in the first flow passage 1a. Thus, there is almost no movement amount by a sample fluid flow velocity in the X-Z plane. For this reason, the particle movement amount specifying unit 22 can observe the Brownian motion without correcting the particle movement amount depending on the sample fluid flow velocity.

The particle size specifying unit 23 specifies, for each particle, a particle size d from the frame rate and each movement amount x, z in the two-dimensional direction as described above.

For example, the particle size specifying unit 23 specifies a diffusion coefficient D according to the following formula. In this formula, t is a time interval defined by the frame rate.

$$D = <x^2 + z^2>/(4 \cdot t)$$

In this formula, <a> indicates the average of a.

That is, the particle size specifying unit 23 specifies, based on the position of the particle at chronological N frames (still images) forming the captured image, actual movement amounts corresponding to the X-direction and Z-direction movement amounts of the particle between two continuous frames. In this manner, up to (N−1) averages of the sum of the square of the movement amount x in the X-direction and the square of the movement amount z in the Z-direction are calculated as $<x^2+z^2>$.

Moreover, the particle size specifying unit 23 specifies the particle size d according to the following formula (a Stokes-Einstein formula).

$$d = k_B \cdot T / (3\pi \cdot \eta \cdot D)$$

In this formula, kB is a Boltzmann constant, T is an absolute temperature, and η is the viscosity coefficient of the sample fluid.

Figure 4:
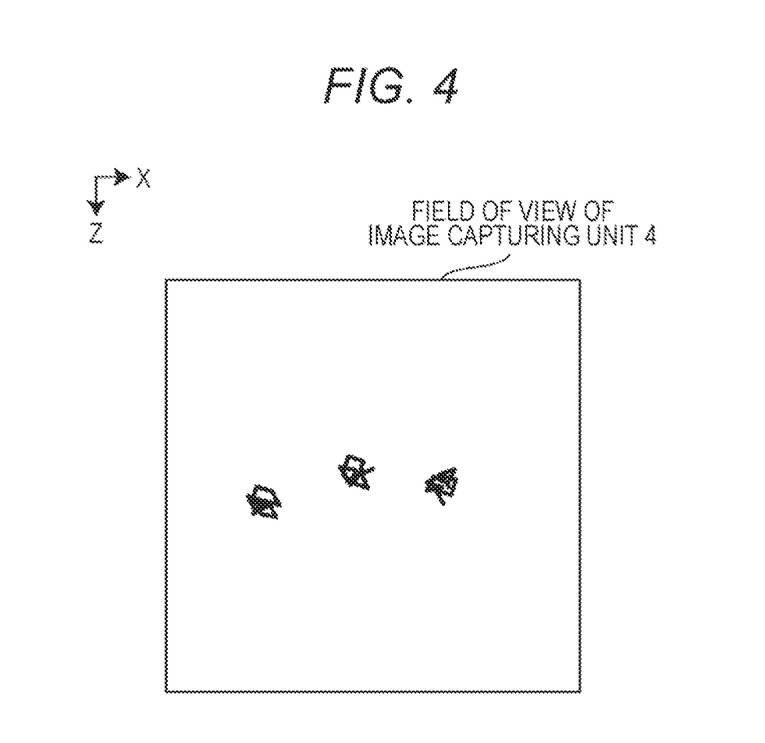
FIG. 4 illustrates a view for describing Brownian motion of particles in an X-Z plane in the first embodiment, the Brownian motion being observed by an imaging unit 4.

FIG. 4 is a view for describing the Brownian motion of the particle in the X-Z plane in the first embodiment, the Brownian motion being observed by the imaging unit 4. This figure illustrates a case where images of three particles are captured in the detection region. FIG. 4 is a view illustrating the track of each particle corresponding to the movement amount by the Brownian motion, the track being obtained in such a manner that the particle position specified at each frame is connected by a line. The length of each line indicates the movement amount per frame. As described above, in the case of observing the Brownian motion of the particle in the X-Z plane, correction of the particle movement amount depending on the sample fluid flow velocity is not necessary.

Further, the signal processing unit 11 includes the scattered light intensity specifying unit 31 configured to specify a representative luminance value of a track of the scattered light of each tracked particle.

The scattered light intensity specifying unit 31 receives the image information sent in a case where the particle movement amount specifying unit 22 has specified the particle. A proper method such as binarization for area correction is used for the average of the luminance obtained at each measurement point or the maximum luminance value of the same particle in the above-described track, and in this manner, a scattered light intensity equivalent value of the particle is specified by the scattered light intensity specifying unit 31.

An analysis unit 35 calculates the number concentration for each particle size based on the particle size specified by the particle size specifying unit 23. Moreover, the analysis unit 35 analyzes, for each particle, characteristics of the particle based on the particle size based on the diffusion coefficient specified by the particle size specifying unit 23 and the scattered light intensity equivalent value specified by the scattered light intensity specifying unit 31. For example, a particle having a known particle size and considered as having a substantially single particle size can be used as a sample particle. Such a particle includes, for example, a polystyrene latex particle. Such a particle may be taken as the sample particle to obtain a relationship between the known particle size and a scattered light intensity relative to a known refractive index in advance. This can specify the refractive index of the particle, or can distinguish the particle and an air bubble from each other. Moreover, these results are output to, e.g., a not-shown storage unit, a not-shown display unit, or a not-shown external output device.

Next, operation of the particle measuring device according to the first embodiment will be described.

When operation of the particle measuring device begins, the light source 2 is turned on. Then, the irradiation optical system 3 irradiates, with the laser light from the light source 2, the sample fluid in the first flow passage 1a formed by the flow cell 1. The imaging unit 4 captures the particle image based on the scattered light from the particle in the detection region of the first flow passage 1a through which the laser light passes. At this point, an image of the scattered light having passed through a bent portion forming the spherical dimple 1c (the concave lens) of the flow cell 1 is, through the condensing optical system 5, captured by the imaging unit 4 from the position facing the extension direction (the Y-direction in FIG. 1) of the fluid flow in the first flow passage 1a.

Then, the signal processing unit 11 receives the captured image from the imaging unit 4. Then, each movement amount x, z of the particle in the two-dimensional direction by the Brownian motion is, as described above, specified by the signal processing unit 11 based on the multiple frames (still images) of the particle image captured at the predetermined frame rate (fps). Further, the signal processing unit 11 specifies the particle size and the representative scattered light intensity equivalent value from the frame rate (fps) and each movement amount x, z in the two-dimensional direction. In this manner, the number concentration for each particle size or the particle refractive index can be measured, for example.

As described above, according to the first embodiment, the flow cell 1 includes the sample fluid flow passage 1a. The irradiation optical system 3 irradiates, with the light from the light source 2, the sample fluid in the flow passage 1a. The imaging unit 4 captures, from the extension direction of the flow passage 1a, the image of the scattered light from the particle in the detection region of the flow passage 1a through which the above-described light passes. The particle size specifying unit 23 specifies the movement amounts of the particle in the two-dimensional direction by the Brownian motion based on the multiple still images of the particle image captured by the imaging unit 4 at the predetermined frame rate. From the specified movement amounts in the two-dimensional direction, the particle size is specified by the particle size specifying unit 23.

In this manner, the particle size in the sample fluid is measured with favorable accuracy.

That is, the sample fluid flows in the laminar flow state along the Y-direction in and around the detection region of the first flow passage 1a. As a result, the particle image is captured from the extension direction of the first flow passage 1a. Thus, in the X-Z plane, almost no movement amount by the sample fluid flow velocity is observed. Thus, it is not necessary to correct the particle movement amount depending on the sample fluid flow velocity. As a result, the particle movement amount is measured with favorable accuracy, and therefore, the particle size is measured with favorable accuracy.

Moreover, in a prior example, an image of particle motion is captured from the vertical direction against a sample fluid flow direction. The effective depth of an image capturing system in an optical axis direction depends on the depth of field of a light receiving system. For this reason, it is, as a result, difficult to set a particle detection region. In the present disclosure, the depth of field of an image capturing system does not influence setting of the particle detection region. Thus, setting of the particle detection region is facilitated. As a result, the particle size and the number concentration can be measured with favorable accuracy.

Second Embodiment

Figure 5:
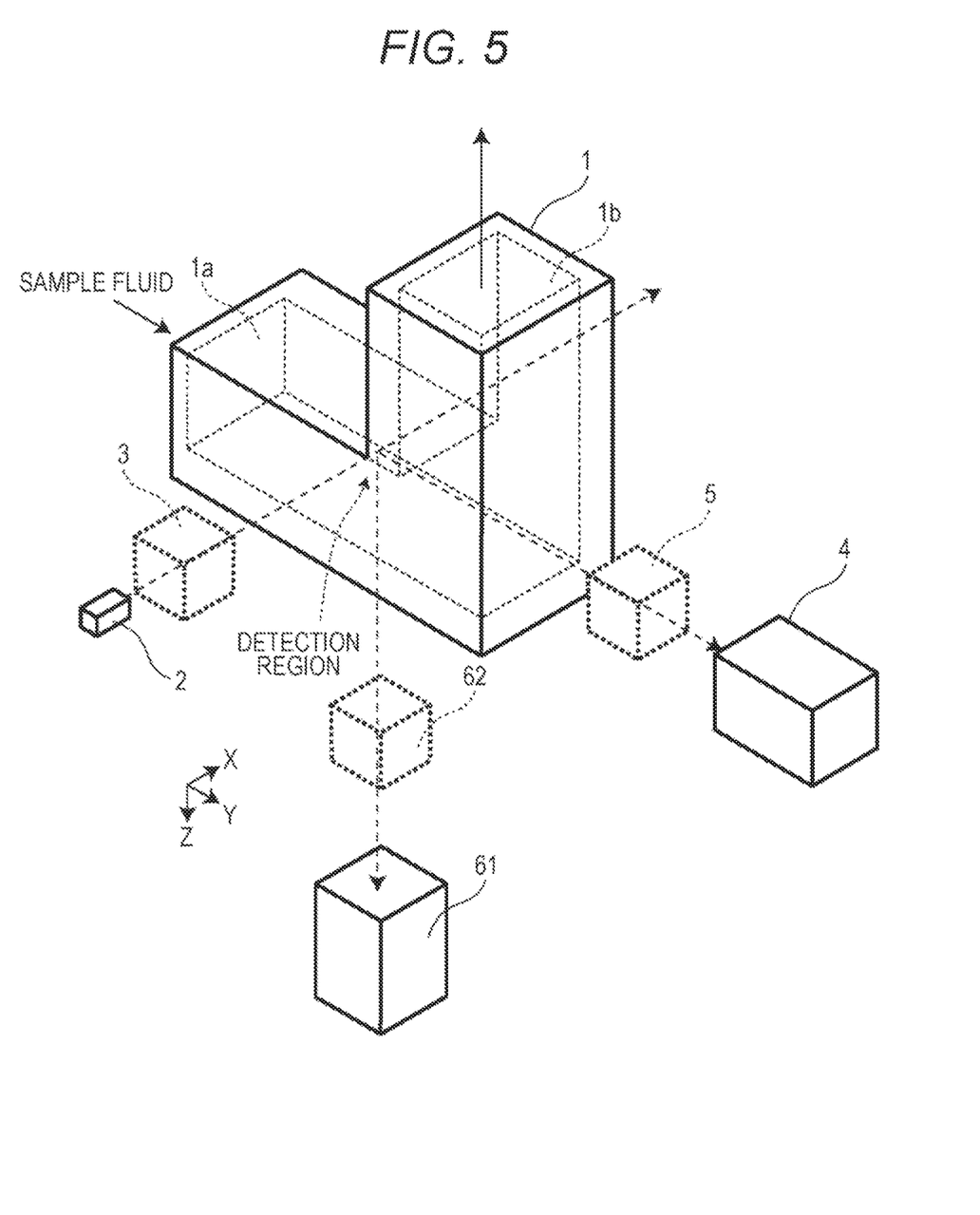
FIG. 5 illustrates a perspective view of an optical structure of a particle measuring device according to a second embodiment of the present disclosure.
Figure 6:
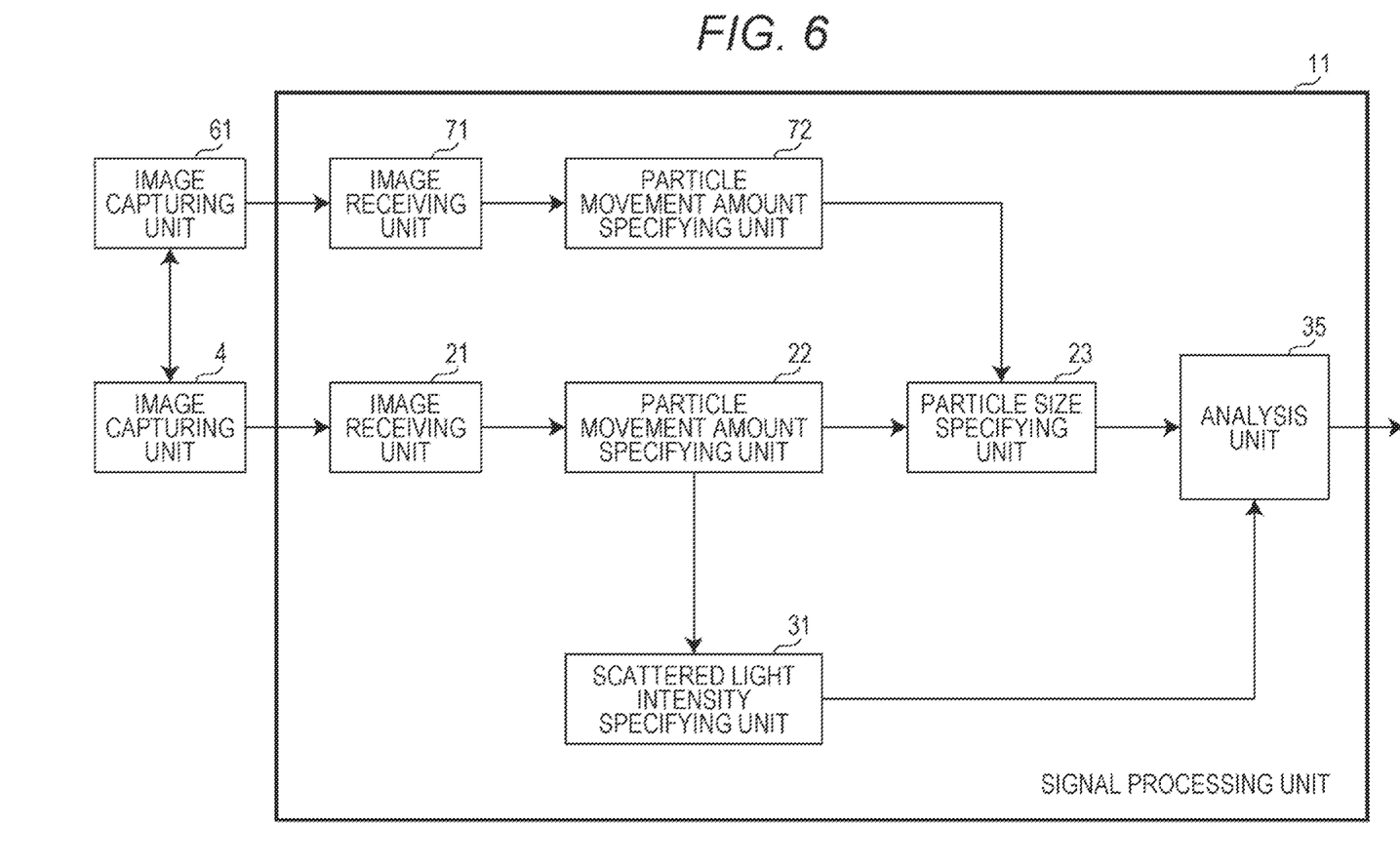
FIG. 6 illustrates a block diagram of an electric structure of the particle measuring device according to the second embodiment of the present disclosure.

FIG. 5 is a perspective view of an optical structure of a particle measuring device according to a second embodiment of the present disclosure. FIG. 6 is a block diagram of an electric structure of the particle measuring device according to the second embodiment of the present disclosure.

As illustrated in FIGS. 5 and 6, the particle measuring device according to the second embodiment further includes an imaging unit 61 (a second imaging unit), a condensing optical system 62, an image receiving unit 71, and a particle movement amount specifying unit 72.

The imaging unit 61 includes an image sensor such as CCD and CMOS. Moreover, the imaging unit 61 uses such an image sensor to capture an image of a particle from the vertical direction (a Z-direction in FIG. 5) against a fluid flow direction (a Y-direction in FIG. 5) in a detection region of a first flow passage 1a based on scattered light from the particle in the above-described detection region.

An imaging unit 4 and the imaging unit 61 preferably have the same frame rate (e.g., 30 frames/second), and can be synchronized with each other to switch a frame. Note that the forms of the imaging unit 4 and the imaging unit 61 are not limited to above. For example, as long as consistent image capturing time is employed for each frame (each still image), any imaging unit 4 and any imaging unit 61 can be used.

The image receiving unit 71 receives, from the imaging unit 61, multiple frames captured by the imaging unit 61.

The particle movement amount specifying unit 72 detects the particle in the detection region at each frame received by the image receiving unit 71. Then, the position of the particle in a two-dimensional direction (an X-Y plane) at each frame is specified by the particle movement amount specifying unit 72. In this manner, the particle movement amount specifying unit 72 specifies each movement amount x, y.

In the second embodiment, a particle size specifying unit 23 specifies each movement amount x, y, z of the particle in a three-dimensional direction by Brownian motion based on each two-dimensional (an X-Z plane) movement amount x, z specified by the particle movement amount specifying unit 22 and each two-dimensional (the X-Y plane) movement amount x, y specified by the particle movement amount specifying unit 72, thereby specifying the particle size d of the particle.

For example, the particle size specifying unit 23 specifies a diffusion coefficient D according to the following formula. In this formula, t is a time interval defined by the frame rate.

$$D = <x^2+y^2+z^2>/(6 \cdot t)$$

That is, the particle size specifying unit 23 specifies, based on the position of the particle at N captured images in the order of image capturing time, movement amounts (actual distances) of the particle in the X-direction, Y-direction, and Z-direction between two continuous captured images. Then, the particle size specifying unit 23 calculates, as $<x^2+y^2+z^2>$, (N−1) averages of the sum of the square of the movement amount x in the X-direction, the square of the movement amount y in the Y-direction, and the square of the movement amount z in the Z-direction.

Then, the particle size specifying unit 23 specifies the particle size d according to the above-described Stokes-Einstein formula.

Note that multiple particles are, in some cases, detected at the frames captured by the imaging unit 4 and the imaging unit 61, for example. In this case, the particle size specifying unit 23 specifies, as a particle image obtained by capturing of a single particle, an image of a particle corresponding to a movement amount in a direction (the X-direction in this case) common to the plane (the X-Z plane) whose image is captured by the imaging unit 4 and the plane (the X-Y plane) whose image is captured by the imaging unit 61.

At this point, the particle size specifying unit 23 directly takes, in the same manner as the first embodiment, the X-direction movement amount obtained from frames (still images) captured by the imaging unit 4 as the X-direction movement amount by the Brownian motion. Moreover, the particle size specifying unit 23 directly takes the Z-direction movement amount obtained from the frames captured by the imaging unit 4 as the Z-direction movement amount by the Brownian motion. Meanwhile, the particle size specifying unit 23 subtracts a movement amount by a sample fluid flow velocity from the Y-direction movement amount obtained from the image captured by the imaging unit 61, thereby specifying the Y-direction movement amount by the Brownian motion.

Figure 7:
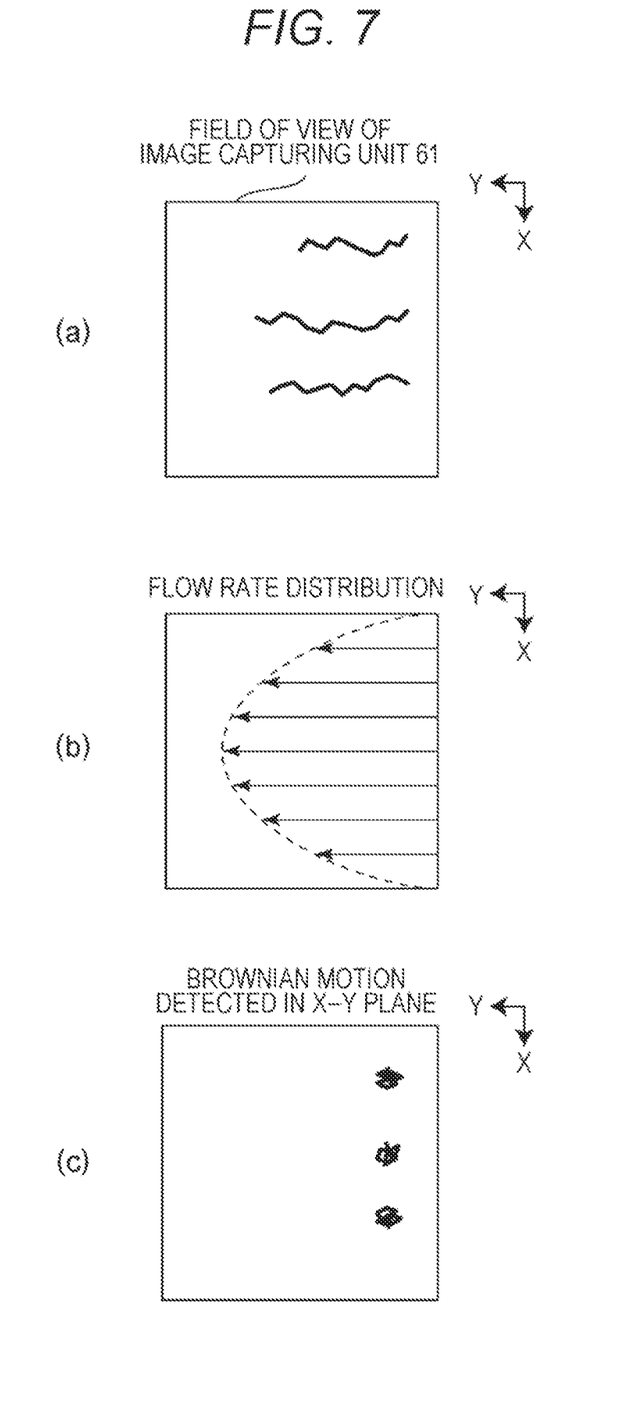
FIG. 7 illustrates views for describing Brownian motion of particles in an X-Y plane in the second embodiment, the Brownian motion being observed by an imaging unit 61.

FIG. 7 illustrates views for describing the Brownian motion of the particle in the X-Y plane in the second embodiment, the Brownian motion being observed by the imaging unit 61. FIG. 7(a) illustrates a track of the particle corresponding to a movement amount across a predetermined number of frames. FIG. 7(b) illustrates sample fluid flow velocity distribution in the Y-direction. FIG. 7(c) illustrates the track of the particle corresponding to the movement amount across the predetermined number of frames.

The sample fluid flow velocity distribution can be specified by fitting of a flow velocity model (simulation) or pre-measurement of the flow velocity model by experiment, for example. The sample fluid flow velocity distribution in the Y-direction in the detection region of the first flow passage 1a is, for example, represented as in FIG. 7(b). A sample fluid movement amount is largest at the center of the detection region, and decreases with the increasing distance from the center. Then, based on such flow velocity distribution and the position of the particle in the X-direction, the Y-direction movement amount by the sample fluid flow velocity is specified. For example, the movement amount by the sample fluid flow velocity is subtracted from the Y-direction particle movement amount obtained from the captured image, and in this manner, each particle movement amount x, y in the two-dimensional direction in the X-Y plane by the Brownian motion is specified.

Next, operation of the particle measuring device according to the second embodiment will be described.

When operation of the particle measuring device begins, a light source 2 is turned on. An irradiation optical system 3 irradiates, with laser light from the light source 2, the sample fluid in the first flow passage 1a included in a flow cell 1. The imaging unit 4 captures the particle image from a position facing the fluid flow direction (the Y-direction in FIG. 1) of the first flow passage 1a based on the scattered light from the particle in the detection region of the first flow passage 1a through which the laser light passes. In addition, the imaging unit 61 captures the particle image from the vertical direction (the Z-direction in FIG. 1) against the fluid flow direction of the flow passage 1a based on the scattered light from the particle in the detection region. At this point, the imaging unit 4 and the imaging unit 61 perform frame synchronization to capture the images at a certain frame rate (fps).

Then, a signal processing unit 11 receives the captured images from the imaging units 4, 61. Then, based on the multiple frames (still images) of the particle images captured at the predetermined frame rate (fps), each particle movement amount x, y, z in the three-dimensional direction by the Brownian motion is, as described above, specified by the signal processing unit 11. In this manner, the particle size can be specified from each movement amount x, y, z in the three-dimensional direction.

Note that other structures and other types of operation of the particle measuring device according to the second embodiment are similar to those of the first embodiment. Thus, description thereof will be omitted.

As described above, according to the second embodiment, the imaging unit 61 captures the particle image from the vertical direction against the fluid flow direction of the first flow passage 1a based on the scattered light from the particle in the detection region of the first flow passage 1a through which the light passes. The particle size specifying unit 23 specifies the particle movement amounts in the three-dimensional direction by the Brownian motion based on the multiple frames of the particle image captured at the predetermined frame rate by the imaging unit 4 and the multiple frames of the particle image captured at the predetermined frame rate by the imaging unit 61. Then, from the above-described movement amounts in the three-dimensional direction and a representative scattered light intensity equivalent amount, the particle size, a number concentration for each particle size, or a particle refractive index is specified by the particle size specifying unit 23, for example.

Thus, the movement amounts in the three-dimensional direction are equivalent to real particle movement amounts. Thus, the particle size and the like in the sample fluid can be, for example, measured with higher accuracy.

Third Embodiment

Figure 8:
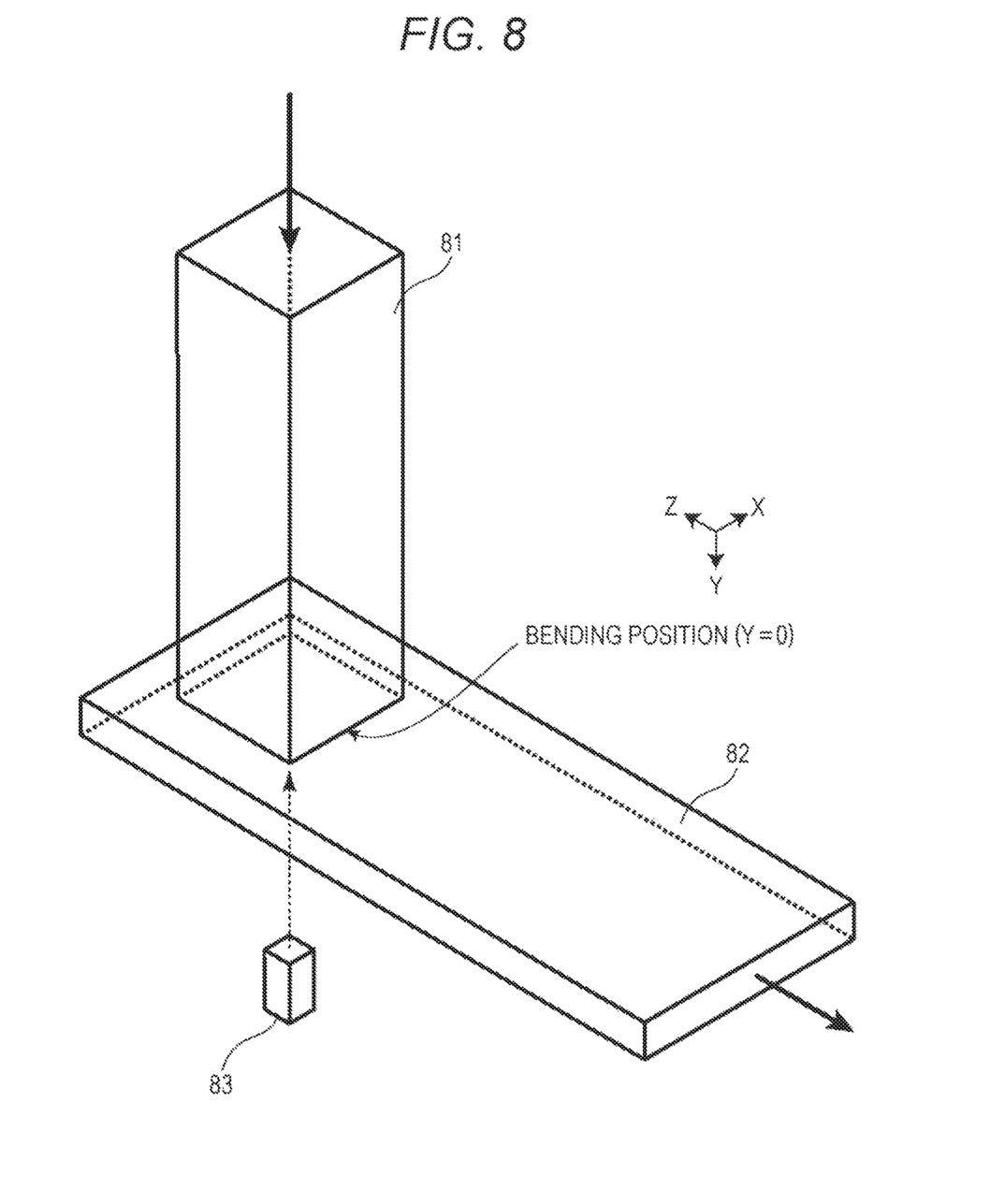
FIG. 8 illustrates a perspective view for describing a structure of a flow passage of a particle measuring device according to a third embodiment.
Figure 9:
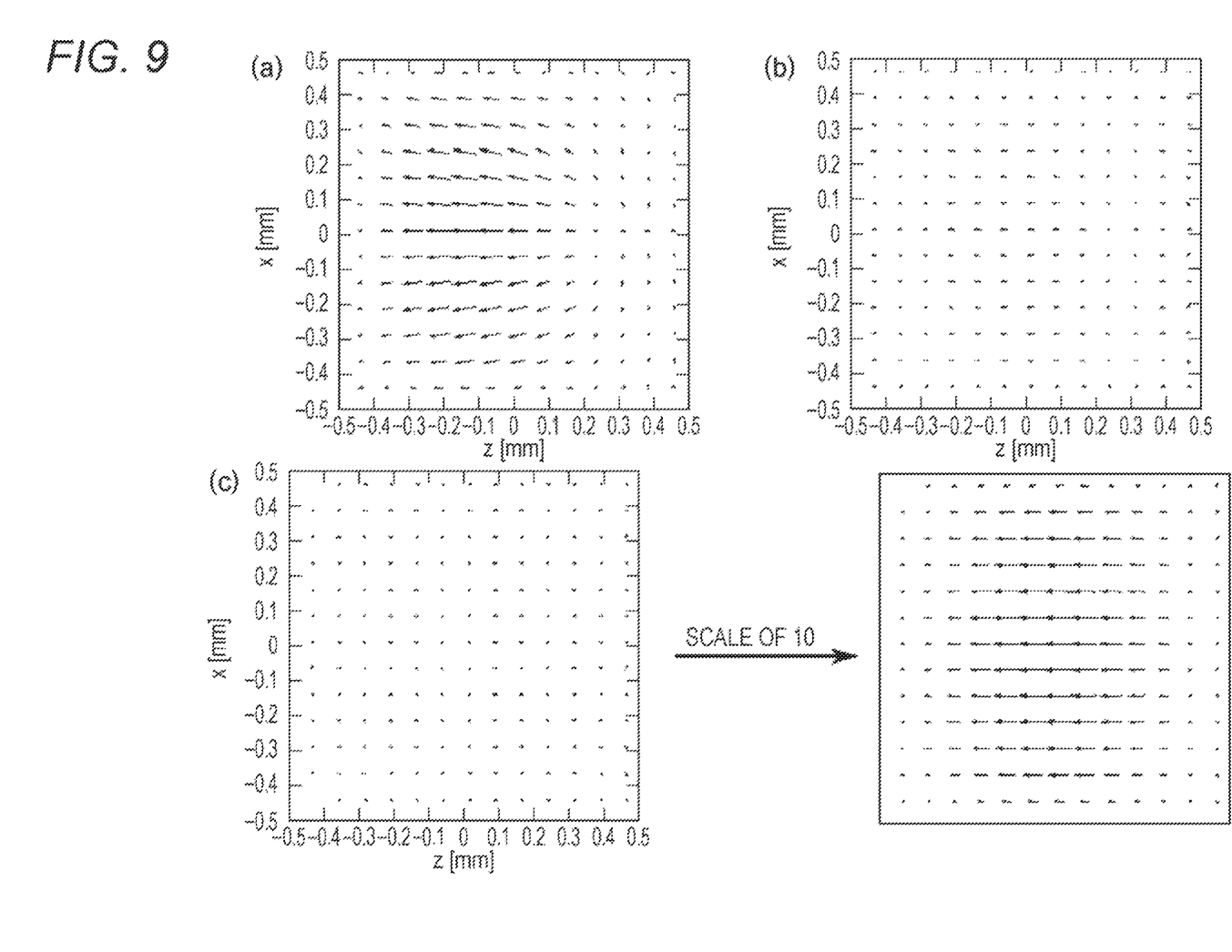
FIG. 9 illustrates graphs for describing flow velocity distribution in a two-dimensional direction, the flow velocity distribution being used in the third embodiment.

FIG. 8 is a perspective view for describing a structure of a flow passage of a particle measuring device according to a third embodiment. FIG. 9 illustrates graphs for describing flow velocity distribution in a two-dimensional direction, the flow velocity distribution being used in the third embodiment.

In the third embodiment, the flow velocity distribution is evaluated by fluid simulation directly calculating a Navier-Stokes equation. A purpose is for verifying whether or not influence of a sample fluid flow velocity needs to be taken into consideration in detection of a movement amount of a particle flowing in a flow cell bent in an L-shape by Brownian motion. Note that such fluid simulation is performed using a known method.

In this fluid simulation, the flow velocity distribution in the flow passage having a shape bent in an L-shape as illustrated in FIG. 8 is calculated. Simulation of flow velocity distribution on an inflow passage side nearby to a joint portion, which is a bent portion of the flow passage, between a first flow passage 81 as a flow passage (a Y-direction) and a second flow passage 82 as a flow passage (a Z-direction) is performed under the following conditions. That is, the section of the first flow passage 81 is in a square of 1 mm×1 mm. Moreover, the section of the second flow passage 82 is in a rectangle of 2.6 mm×0.8 mm.

Moreover, in such simulation, sample fluid is incompressible fluid (water) with a density of 1 g/mL and a viscosity of 1 mPa·s. Further, the flow rate of the sample fluid is 0.3 mL/min. Note that an average flow velocity in the first flow passage 81 in this case is 5.0 mm/s.

FIG. 9 illustrates two-dimensional flow velocity vectors in the section (the vertical section against an axial direction of the first flow passage 81) of the first flow passage 81 at positions (in FIG. 8, Y=−0.25 mm, −0.5 mm, −0.75 mm) apart from a bending position (in FIG. 8, Y=0) of the joint portion between the first flow passage 81 and the second flow passage 82 toward a first flow passage 81 side by 0.25 mm, 0.5 mm, and 0.75 mm. FIG. 9(a) illustrates the case of 0.25 mm. FIG. 9(b) illustrates the case of 0.5 mm. FIG. 9(c) illustrates the case of 0.75 mm. Note that the two-dimensional flow velocity vectors in the section indicate a maximum flow velocity value in the section, i.e., a magnitude standardized by an in-plane average flow velocity of 5.0 mm/s. Any result shows a flow velocity component in the vertical bending direction (the Z-direction) against the first flow passage 81 at and around the center of the first flow passage 81. Moreover, it has been found that as a distance from the bent portion of the first flow passage 81 increases, the vertical flow velocity component against the first flow passage 81 attenuates, i.e., a flow along the first flow passage 81 is formed. These simulation results show that the flow velocity component in the bending direction decreases to lower than 1% of the average flow velocity at a position apart from the bending position by equal to or more than 1 mm as the width (a width in an X-direction or a width in the Z-direction in FIG. 9) of the first flow passage 81.

Thus, in the process of observing, from an inflow passage direction (the Y-direction), the Brownian motion of the particle nearby to the bent portion of the L-shaped flow passage illustrated in FIG. 8 to specify a particle size from the Brownian motion, correction is preferably made in consideration of the flow velocity component in the vertical bending direction (the Z-direction in FIG. 9) against the first flow passage 81.

In the third embodiment, in a case where the detection region is within a predetermined area (an area where the distance from the bending position is less than 1 mm as described above) from the bending position of the flow passage, sample fluid flow velocity components in the two-dimensional direction (the X-direction and the Z-direction) in a section (a X-Z plane in FIG. 8) at a position (i.e., a position in the Y-direction along the first flow passage 81 in FIG. 8) in the detection region in the first flow passage 81 are, based on the above-described finding, specified by the above-described fluid simulation based on the flow passage shape of the particle measuring device and fluid characteristics of the sample fluid.

Moreover, in the third embodiment, an imaging unit 83 similar to the above-described imaging unit 4 captures an image of scattered light from the particle in the detection region from a position facing a fluid flow direction in the detection region. Then, a particle size specifying unit 23 specifies the particle movement amounts in the two-dimensional direction by the Brownian motion based on multiple still images of a particle image captured at a predetermined frame rate by the imaging unit 83 and the two-dimensional sample fluid flow velocity components, which are specified in advance by the fluid simulation, in the detection region. In this manner, the particle size can be specified from the corrected movement amounts in the two-dimensional direction.

Specifically, the particle size specifying unit 23 specifies, based on the position of the particle across chronological N frames (still images) forming the captured image, actual movement amounts corresponding to the particle movement amounts in the X-direction and the Z-direction between two continuous frames. Then, movement amounts by the two-dimensional sample fluid flow velocity components specified in advance by the fluid simulation are subtracted from the actual movement amounts, and in this manner, the particle movement amounts in the two-dimensional direction by the Brownian motion are specified by the particle size specifying unit 23. Then, in the same manner as the first embodiment, the particle size is specified from the particle movement amounts in the two-dimensional direction by the Brownian motion.

Note that other structures and other types of operation of the particle measuring device according to the third embodiment are similar to those of the first or second embodiment. Thus, description thereof will be omitted.

As described above, according to the third embodiment, even in a case where the detection region is nearby to the bent portion of the flow passage, the particle movement amounts in the two-dimensional direction by the Brownian motion are accurately specified, and therefore, the particle size is accurately specified.

Note that various changes and modifications to the above-described embodiments are obvious to those skilled in the art. These changes and modifications may be made without departing from the gist and technical scope of the present embodiments or degrading intended advantageous effects. That is, these changes and modifications are intended to be included in the technical scope of the present embodiments.

For example, in the first, second, and third embodiments, the analysis unit 35 may count, for each particle size specified by the particle size specifying unit 23, the number of particles having such a particle size to calculate the number concentration. In this case, particle size distribution can be calculated from such a number concentration for each optional particle size range by the particle size specifying unit 23.

INDUSTRIAL APPLICABILITY

A particle measuring device and a particle measuring method according to the present disclosure are applicable to, for example, measurement of the particle size of a particle included in sample fluid or the number concentration of the particle for each particle size.

LIST OF REFERENCE NUMERALS

1a First flow passage
1b Second flow passage
2 Light source
3 Irradiation optical system
4 Imaging unit (one example of first imaging unit)
22 Particle movement amount specifying unit
23 Particle size specifying unit
31 Scattered light intensity specifying unit
35 Analysis unit
61 Imaging unit (one example of second imaging unit)

The invention claimed is:

1. A particle measuring device comprising:
a flow cell including a flow passage of sample fluid containing a particle;
a light source configured to output light;
an irradiation optical system configured to irradiate, with the light from the light source, the sample fluid in the flow passage;
a first imaging unit arranged at a position facing or opposite to a fluid flow direction in which the sample fluid flows in the flow passage and configured to capture, from an extension direction of the flow passage, first multiple still images of scattered light from the particle in a detection region in the flow passage, the light passing through the detection region;
a first particle movement amount specifying unit configured to specify a position of the particle in each of the first multiple still images and specify a first movement amount of the particle in a first direction by Brownian motion and a second movement amount of the particle in a second direction by Brownian motion based on the position of the particle in each of the first multiple still images, the second direction being vertical against the first direction, the first direction and the second direction being vertical against the fluid flow direction; and
a particle size specifying unit configured to specify particle size of the particle from the first movement amount in the first direction and the second movement amount in the second direction without correcting a particle movement amount depending on a flow of the sample fluid.

2. The particle measuring device according to claim 1, further comprising:
a second imaging unit configured to capture, from the first direction, second multiple still images of the scattered light from the particle in the detection region of the flow passage through which the light passes; and
a second particle movement amount specifying unit configured to specify a position of the particle in each of the second multiple still images and specify the second movement amount of the particle in the second direction and a third movement amount of the particle in the fluid flow direction based on the position of the particle in each of the second multiple still images, wherein
the particle size specifying unit specifies the particle size of the particle from the first movement amount in the first direction, the second movement amount in the second direction and the third movement amount in the fluid flow direction.

3. The particle measuring device according to claim 2, wherein
the first imaging unit and the second imaging unit have an identical frame rate, and are synchronized with each other to switch a frame, and wherein
the particle size specifying unit specifies, for an identical particle, one of the first multiple still images captured by the first imaging unit and one of the second multiple still images captured by the second imaging unit, thereby specifying the first movement amount in the first direction, the second movement amount in the second direction and the third movement amount in the fluid flow direction and specifying the particle size of the particle from the first movement amount in the first direction, the second movement amount in the second direction and the third movement amount in the fluid flow direction.

4. The particle measuring device according to claim 1, further comprising:
a scattered light intensity specifying unit configured to specify a scattered light intensity equivalent value of the particle from the first multiple still images; and
an analysis unit configured to analyze a refractive index of the particle based on the particle size specified by the particle size specifying unit and the scattered light intensity equivalent value specified by the scattered light intensity specifying unit.

5. The particle measuring device according to claim 1, wherein
the flow cell has a shape bent in an L-shape, and wherein
the first imaging unit is arranged at the position facing the fluid flow direction and captures the first multiple still images from the position facing the fluid flow direction in the detection region.

6. The particle measuring device according to claim 5, wherein
the flow cell has a spherical dimple at a portion bent in the L-shape, and wherein
the first imaging unit captures, through the dimple, the first multiple still images of the scattered light from the particle in the detection region.

7. The particle measuring device according to claim 1, further comprising:
an analysis unit configured to count, for each particle size specified by the particle size specifying unit, the number of particles having the each particle size to calculate a number concentration and calculate particle size distribution from the number concentration for each optional particle size range.

8. The particle measuring device according to claim 1, wherein the first particle movement amount specifying unit is configured to associate the particle in each of the first multiple still images, specify a track of the particle across the first multiple still images thereby specifying the first movement amount in the first direction and the second movement amount in the second direction.

9. The particle measuring device according to claim 1, wherein the first imaging unit is configured to capture the first multiple still images at a predetermined frame rate, and
the particle size specifying unit is configured to specify the particle size of the particle from the predetermined frame rate, the first movement amount in the first direction and the second movement amount in the second direction.

10. A particle measuring device comprising:
a flow cell including a flow passage of sample fluid containing a particle;
a light source configured to output light;
an irradiation optical system configured to irradiate, with the light from the light source, the sample fluid in the flow passage;
a first imaging unit arranged at a position facing a fluid flow direction in which the sample fluid flows in the flow passage; and
a particle size specifying unit, wherein
the first imaging unit captures, from the position facing the fluid flow direction in a detection region, multiple still images of scattered light from the particle in the detection region within a predetermined area from a bending position of the flow passage, the light passing through the detection region, and wherein
the particle size specifying unit specifies a position of the particle in each of the multiple still images, specifies a first movement amount of the particle in a first direction by Brownian motion and a second movement amount of the particle in a second direction by Brownian motion based on the position of the particle in each of the multiple still images, the second direction being vertical against the first direction, the first direction and the second direction being vertical against the fluid flow direction, and
the particle size specifying unit specifies a flow velocity component of the sample fluid in the first direction and the second direction in the detection region, corrects the first movement amount in the first direction and the second movement amount in the second direction by subtracting a movement amount by the flow velocity component from the first movement amount in the first direction and the second movement amount in the second direction, and specifies a particle size of the particle from the corrected first movement amount in the first direction and the corrected second movement amount in the second direction.

11. A particle measuring method comprising:
irradiating, with light from a light source, sample fluid in a flow passage included in a flow cell;
capturing, by a first imaging unit arranged at a position facing or opposite to a fluid flow direction in which the sample fluid flows in the flow passage, from an extension direction of the flow passage, multiple still images of scattered light from a particle in a detection region in the flow passage, the light passing through the detection region;
specifying a position of the particle in each of the multiple still images;
specifying a first movement amount of the particle in a first direction by Brownian motion and a second movement amount of the particle in a second direction by Brownian motion based on the position of the particle in each of the multiple still images, the second direction being vertical against the first direction, the first direction and the second direction being vertical against the fluid flow direction; and
specifying a particle size of the particle from the first movement amount in the first direction and the second movement amount in the second direction without correcting a particle movement amount depending on a flow of the sample fluid.

* * * * *